United States Patent
Jaloma et al.

(10) Patent No.: US 11,455,264 B2
(45) Date of Patent: Sep. 27, 2022

(54) MINIMIZING DELAY WHILE MIGRATING DIRECT MEMORY ACCESS (DMA) MAPPED PAGES

(71) Applicant: International Business Machines Corporation, Armonk, NY (US)

(72) Inventors: Jaime Jaloma, Austin, TX (US); Mark Rogers, Round Rock, TX (US); Arnold Flores, Round Rock, TX (US); Gaurav Batra, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/989,248

(22) Filed: Aug. 10, 2020

(65) Prior Publication Data
US 2022/0043764 A1 Feb. 10, 2022

(51) Int. Cl.
*G06F 13/28* (2006.01)
*G06F 3/06* (2006.01)

(52) U.S. Cl.
CPC ............ *G06F 13/28* (2013.01); *G06F 3/0611* (2013.01); *G06F 3/0631* (2013.01); *G06F 3/0659* (2013.01); *G06F 3/0673* (2013.01)

(58) Field of Classification Search
CPC .... G06F 3/0611; G06F 3/0631; G06F 3/0659; G06F 3/0673; G06F 13/28
See application file for complete search history.

(56) References Cited

U.S. PATENT DOCUMENTS

| | | | |
|---|---|---|---|
| 7,533,198 B2 | 5/2009 | Bartley et al. | |
| 8,738,860 B1 | 5/2014 | Griffin et al. | |
| 9,747,220 B2 | 8/2017 | Goss et al. | |
| 9,760,512 B1* | 9/2017 | Arroyo | G06F 13/4282 |
| 10,068,054 B2 | 9/2018 | Van Rooyen et al. | |
| 2004/0064601 A1* | 4/2004 | Swanberg | G06F 12/1081 710/22 |
| 2004/0064673 A1 | 4/2004 | Rogers et al. | |
| 2008/0005383 A1* | 1/2008 | Bender | G06F 13/28 710/22 |
| 2016/0378397 A1 | 12/2016 | Rogers et al. | |

FOREIGN PATENT DOCUMENTS

| | | |
|---|---|---|
| CN | 110941565 A | 3/2020 |
| WO | 03021800 A1 | 3/2003 |

OTHER PUBLICATIONS

Saidi, "Optimizing DMA Data Transfers for Embedded Multi-Cores", Oct. 24, 2012.

(Continued)

*Primary Examiner* — Idriss N Alrobaye
*Assistant Examiner* — Brooke J Taylor
(74) *Attorney, Agent, or Firm* — Garg Law Firm, PLLC; Rakesh Garg; Nathan Rau

(57) ABSTRACT

During a memory reallocation process, it is determined that a set of memory pages being reallocated are each enabled for a Direct Memory Access (DMA) operation. Prior to writing initial data to the set of memory pages, a pre-access delay is performed concurrently for each memory page in the set of memory pages.

25 Claims, 8 Drawing Sheets

(56) References Cited

OTHER PUBLICATIONS

Mantovani et al., "Handling Large Data Sets for High-Performance Embedded Applications in Heterogeneous Systems-on-Chip", Cases '16, Oct. 1-7, 2016, Pittsburgh, PA, USA.
Kaestle, "Machine-Aware Memory Allocation and Synchronization", 2016.
Lee et al., "Decoupled Direct Memory Access: Isolating CPU and IO Traffic by Leveraging a Dual-Data-Port DRAM", 2017.
ip.com, "An Apparatus to Enable Management of Memory Between Coherent Devices". Jul. 6, 2018.
ip.com, "Method for Optimizing DMA Translation Performance through Multiple I/O Page Sizes within a Single Translation Table", Apr. 9, 2015.
International Searching Authority, PCT/EP2021/072163, dated Nov. 18, 2021.

* cited by examiner

MINIMIZING DELAY WHILE MIGRATING DIRECT MEMORY ACCESS (DMA) MAPPED PAGES

BACKGROUND

The present invention relates generally to a method, system, and computer program product for computer system memory management. More particularly, the present invention relates to a method, system, and computer program product for minimizing delay while migrating Direct Memory Access (DMA) mapped pages.

A page is a unit of physical or virtual memory. Some combinations of hardware and operating systems support only one page size, while others support multiple page sizes, for example one or more of 16 kilobytes, 64 kilobytes, 16 megabytes, 64 megabytes, and 16 gigabytes. A segment is a unit of physical or virtual memory including one or more pages.

DMA allows certain hardware devices to access physical system memory directly. Typically, a processor initiates a data transfer, then performs other operations while the transfer is in progress. Mapping a device for DMA access means allocating a buffer of system memory, and associating a range of system memory addresses within the buffer with corresponding addresses in the device's memory. As a result, a read or write to addresses within the assigned system memory address range actually accesses the DMA mapped device instead.

An interrupt is often used to signal a processor that a DMA operation has completed. However, the operation may not have actually completed when the interrupt is generated, and some data may not yet have arrived at its destination. Thus, when reallocating system memory, some computer systems implement a reallocation delay, with a predetermined length before releasing a DMA mapped memory page for another use.

The illustrative embodiments recognize that, as currently implemented, computer systems that implement a predetermined reallocation delay do so as each DMA mapped memory page is reallocated. Thus, if memory being reallocated includes a number of DMA mapped pages, separate delays are performed for each DMA mapped page, resulting in a total delay that is the sum of each separate delay. When reallocating large amounts of memory, for example in a system with 32 terabytes of memory, the resulting total delay time degrades system performance and results in customer complaints. Thus, the illustrative embodiments recognize that there is an unmet need to shorten the total reallocation delay time, while still maintaining data integrity.

SUMMARY

The illustrative embodiments provide a method, system, and computer program product. An embodiment includes a method that determines, during a memory reallocation process, that a set of memory pages being reallocated are each enabled for a DMA operation. An embodiment performs, prior to writing initial data to the set of memory pages, a pre-access delay, the pre-access delay performed concurrently for each memory page in the set of memory pages.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
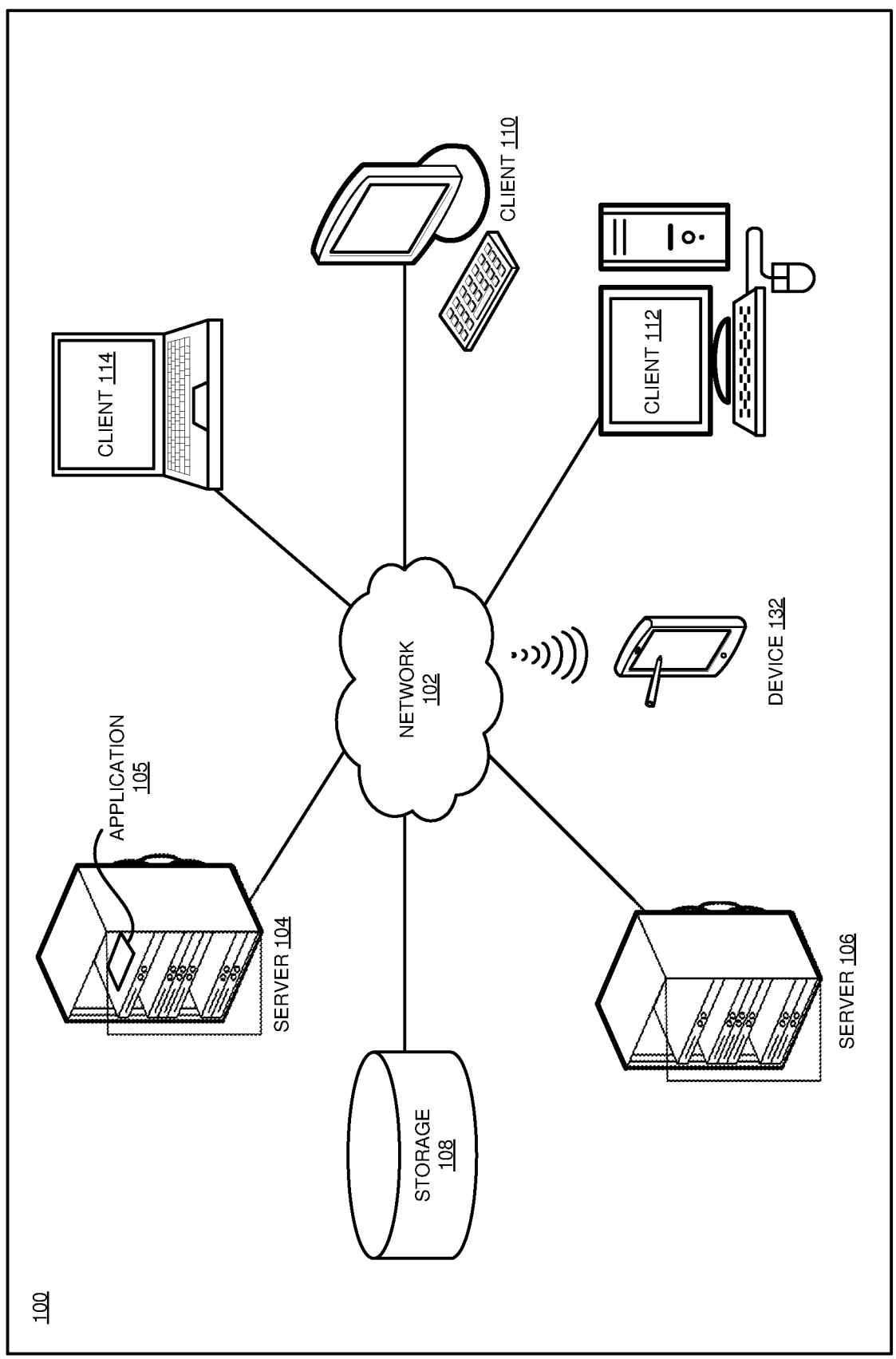
FIG. 1 depicts a block diagram of a network of data processing systems in which illustrative embodiments may be implemented.

The illustrative embodiments recognize that there is an unmet need to shorten the total reallocation delay time, while maintaining data integrity. The illustrative embodiments recognize that the presently available tools or solutions do not address these needs or provide adequate solutions for these needs. The illustrative embodiments used to describe the invention generally address and solve the above-described problems and other problems related to DMA memory delay minimization.

An embodiment can be implemented as a software application. The application implementing an embodiment can be configured as a modification of an existing memory management system, as a separate application that operates in conjunction with an existing memory management, a stand-alone application, or some combination thereof.

Particularly, some illustrative embodiments provide a method that determines, during a memory reallocation process, that a set of memory pages being reallocated are each enabled for DMA operation. The method performs a pre-access delay concurrently for each DMA enabled memory page, then writes initial data to the set of memory pages.

An embodiment receives a memory reallocation request. A memory reallocation request is a request to move, or migrate, the contents of a portion of currently-used memory to a different location. One example reason to move the contents of a portion of memory is to assemble a contiguous area of memory including the original portion of memory. For example, to fulfill an application's request for a contiguous 16 megabyte portion of memory, a memory management system might identify a suitable starting location. However, portions of the proposed contiguous 16 megabytes might already be in use, and thus require relocation of their contents to other locations to free the desired contiguous 16 megabytes for use.

As part of the memory reallocation process, an embodiment determines whether or not a page of memory within the contiguous area of memory being assembled is enabled for DMA operation by being the subject of a DMA mapping. An embodiment detects the presence of a DMA mapping using any suitable technique, and saves the result of the DMA mapping determination. One embodiment uses metadata, maintained by an operating system, to detect the presence of a DMA mapping. For example, the AIX operating system maintains metadata describing the state of each memory page, including the page's size and status (e.g. free, in-use, paged-in, or paged-out), which paging device a page belongs to if a page is in the paging space, and whether a DMA mapper is enabled for the page. Other operating systems maintain similar page-related metadata.

To record a page's DMA operation status, one embodiment maintains a flag for each page or other subset of memory being reallocated. A page's flag is set if that page requires a delay due to the DMA mapping, and cleared otherwise. Another embodiment maintains one flag for the entire portion of memory being consolidated. The flag is set if any page within the entire portion requires a delay due to the DMA mapping, and cleared otherwise. Another embodiment records the necessity for a delay using another presently-known technique.

When recording a page's DMA operation status, one embodiment also records a time at which migration away from that page occurred, using any presently-known technique. Then, once the memory reallocation process is complete, the embodiment also references a time at which data migration away from a particular DMA-mapped page occurred. If sufficient time has already elapsed since the migration, the delay has, in effect, already been performed and need not be performed again. For example, consider a memory reallocation process in which an embodiment encounters DMA mapped pages early in the process. By the time the reallocation process is complete, the delay time might already have elapsed naturally, and an additional delay is not required. Thus, if the delay need not be performed, the embodiment clears any appropriate DMA flags.

Before releasing a newly-assembled contiguous region of memory for use, the region should be set to a predetermined initial value. Setting memory region to an initial value overwrites data that was previously stored in the region by a different application, preventing the previously stored data from being accessed in an unauthorized manner. The initial value is typically zero, although other initial values or patterns of values are also possible. Because the initial value is typically zero, a component that sets one or more initial values is also referred to as a zeroing engine. In addition, some applications mistakenly assume that newly-allocated memory is set to zero or another predetermined value, resulting in software errors. Setting a memory region to zero helps prevent these errors. Further, if an application is provided with memory already set to a desired value (e.g. zero), the application does not have to perform the initialization itself, resulting in increased application efficiency.

Some operating systems also include a memory allocation function that sets newly-allocated memory to a particular value or pattern.

A presently-known implementation of a system that sets an area of memory to a predetermined initial value receives one or more ranges of memory addresses, optionally subdivides the ranges into smaller ranges, and uses a set of worker threads executing in parallel with each other to set each memory range to the initial value. In one presently-known implementation each range of memory addresses is a 16 megabyte page of memory. In another presently-known implementation each range of memory addresses is a page of memory that is smaller or larger than 16 megabytes. In another presently-known implementation each range of memory addresses is a segment of memory including a number of memory pages. Some presently-known implementations receive one or more starting addresses for the range of memory to be set, and the ending address or size of the range are predetermined constants.

An embodiment modifies a presently-known implementation by determining if any of the input ranges of memory addresses have been flagged as requiring a pre-access delay in a manner described herein. If one or more input ranges of memory addresses pages require a pre-access delay, an embodiment concurrently performs the delay for each memory range. One embodiment performs the delay by delaying process execution for a predetermined amount of time, for example 250 ms.

Once the delay, if performed, is complete, an embodiment uses a set of worker threads, executing in parallel with each other, to set each memory range to a desired initial value. Finally, an embodiment provides the requested contiguous memory region, now allocated and initialized, to the requestor.

The manner of minimizing delay while migrating DMA mapped pages described herein is unavailable in the presently available methods in the technological field of endeavor pertaining to memory management. A method of an embodiment described herein, when implemented to execute on a device or data processing system, comprises substantial advancement of the functionality of that device or data processing system in determining, during a memory reallocation process, that a set of memory pages being reallocated are each enabled for DMA operation. The method performs a pre-access delay concurrently for each DMA enabled memory page, then writes initial data to the set of memory pages.

The illustrative embodiments are described with respect to certain types of portions of memory, delays, initial values, operations, mappings, determinations, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
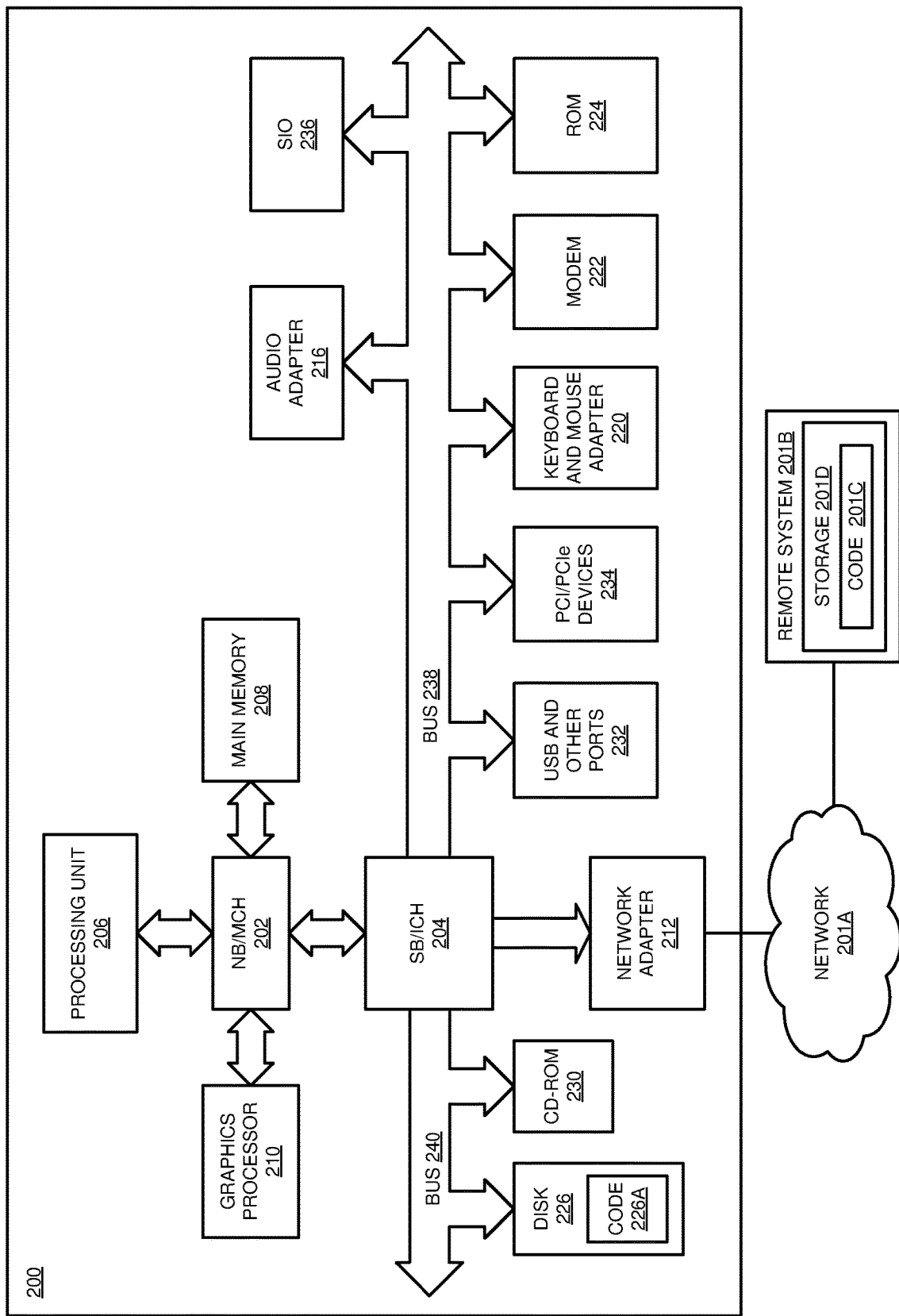
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
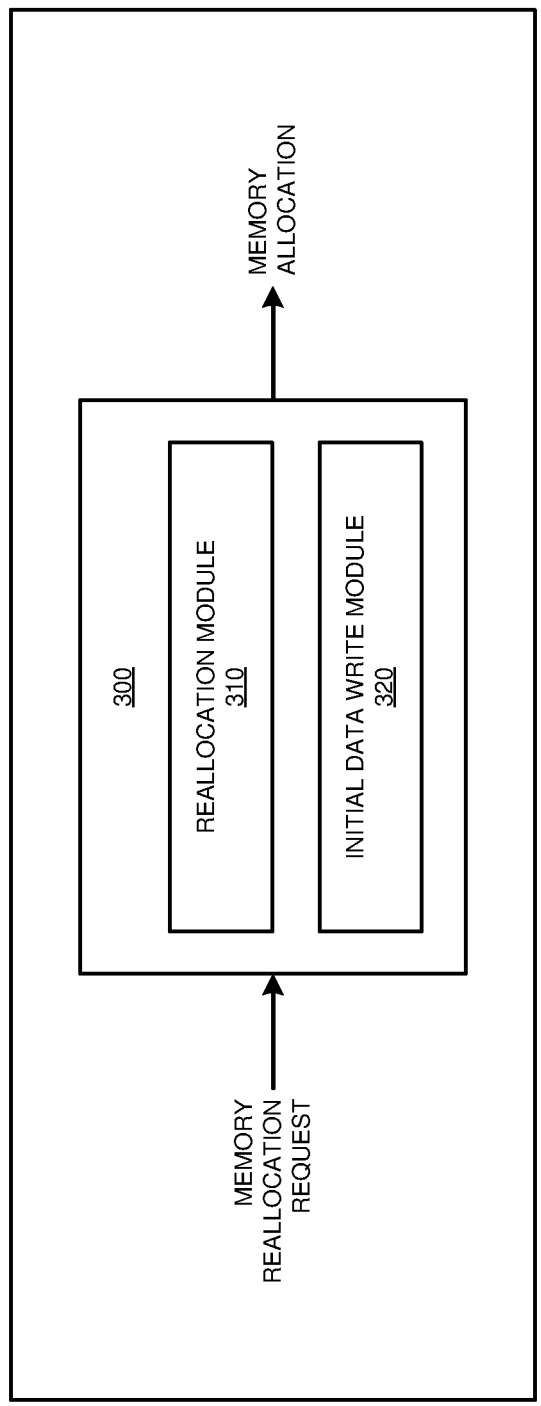
FIG. 3 depicts a block diagram of an example configuration for minimizing delay while migrating DMA mapped pages in accordance with an illustrative embodiment.

With reference to FIG. 3, this figure depicts a block diagram of an example configuration for minimizing delay while migrating DMA mapped pages in accordance with an illustrative embodiment. Application 300 is an example of application 105 in FIG. 1 and executes in any of servers 104 and 106, clients 110, 112, and 114, and device 132 in FIG. 1.

Reallocation module 310 receives a memory reallocation request, for example to move the contents of a portion of memory in order to assemble a contiguous area of memory that includes the original portion. As part of the memory reallocation process, module 310 determines whether or not a page of memory within the contiguous area of memory being assembled is enabled for DMA operation by being the subject of a DMA mapping. Module 310 saves the result of the DMA mapping determination. One implementation of module 310 maintains a flag for each page of memory being reallocated. A page's flag is set if that page requires a delay due to the DMA mapping, and cleared otherwise. Another implementation of module 310 maintains one flag for the entire portion of memory being consolidated. The flag is set if any page within the entire portion requires a delay due to the DMA mapping, and cleared otherwise. Another implementation of module 310 records the necessity for a delay using another suitable technique.

When recording a page's DMA operation status, one implementation of module 310 also records a time at which migration away from that page occurred. Then, once the memory reallocation process is complete, the implementation also references a time at which data migration away from a particular DMA-mapped page occurred. If sufficient time has already elapsed since the migration, the delay has, in effect, already been performed and need not be performed again. Thus, if the delay need not be performed, the implementation of module 310 clears any appropriate DMA flags.

Initial data write module 320 modifies a presently-known implementation by determining if any of the input ranges of memory addresses have been flagged as requiring a pre-access delay in a manner described herein. If one or more input ranges of memory addresses pages require a pre-access delay, module 320 performs the delay for each memory range concurrently. One implementation of module 320 performs the delay by delaying process execution for a predetermined amount of time, for example 250 ms. Once the delay has completed, module 320 uses a set of worker threads, executing in parallel with each other, to set each memory range to a desired initial value. Finally, module 320 provides the requested contiguous memory region, now allocated and initialized, to the requestor.

Figure 4:
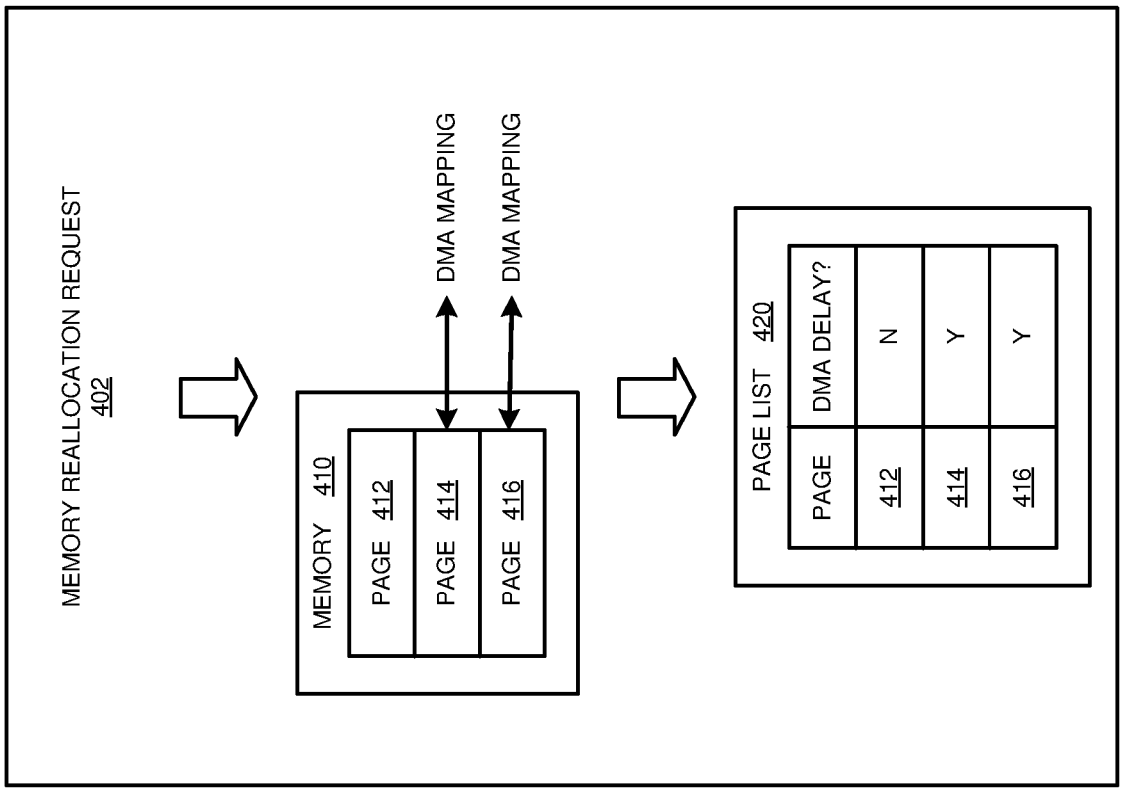
FIG. 4 depicts an example of minimizing delay while migrating DMA mapped pages in accordance with an illustrative embodiment.

With reference to FIG. 4, this figure depicts an example of minimizing delay while migrating DMA mapped pages in accordance with an illustrative embodiment. The example can be executed using application 300 in FIG. 3.

As depicted, application 300 receives memory reallocation request 402. As part of the memory reallocation process within memory 410, application determines that page 412 is not the subject of a DMA mapping, but pages 414 and 416 are the subject of a DMA mapping. As a result, application 300 constructs page list 420. In page list 420, page 412's flag is cleared, indicating that page 412 does not require a delay due to the DMA mapping. Flags for pages 414 and 416 are set, indicating that pages 414 and 416 do require a delay due to the DMA mapping. In another implementation of application 300, page list 420 is replaced by a single flag, which is set if any of pages 412, 414, and 416 are the subject of a DMA mapping, and cleared otherwise.

Figure 5:
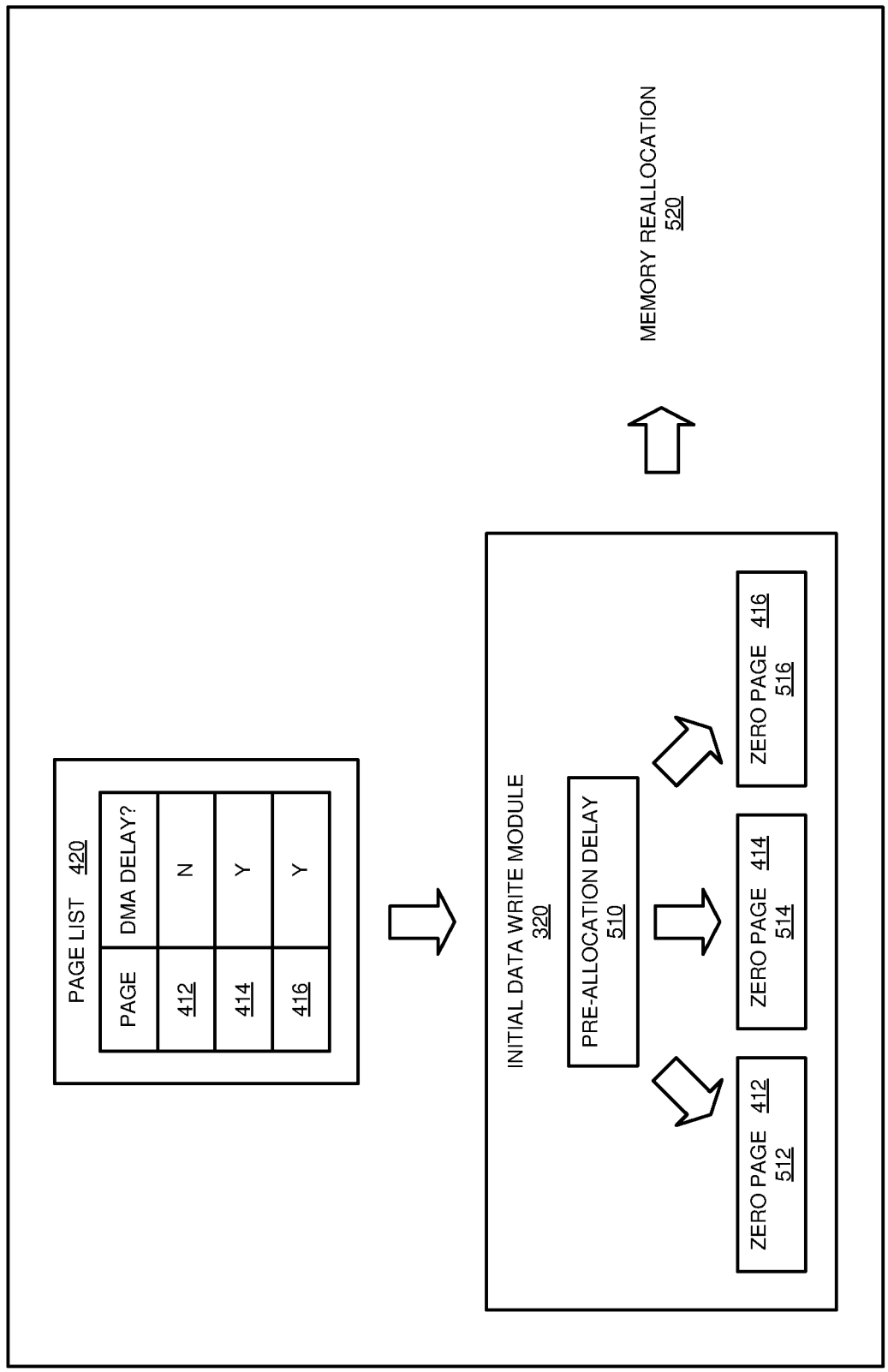
FIG. 5 depicts a continued example of minimizing delay while migrating DMA mapped pages in accordance with an illustrative embodiment.

With reference to FIG. 5, this figure depicts a continued example of minimizing delay while migrating DMA mapped pages in accordance with an illustrative embodiment. Initial data write module 320 is the same as initial data write module 320 in FIG. 3. Pages 412, 414, and 416 and page list 420 are the same as pages 412, 414, and 416 and page list 420 in FIG. 4.

As depicted, in page list 420 flags for pages 414 and 416 are set, indicating that pages 414 and 416 do require a delay due to the DMA mapping. Note that pages 414 and 416 may be subsets of a larger memory range received by initial data write module 320. In addition, page list 420 depicts status for only a portion of one or more ranges of memory addresses received by module 320. Because pages 414 and 416 require a delay, initial data write module 320 performs one pre-allocation delay 510. Once delay 510 has completed, module 320 uses a set of worker threads, executing in parallel with each other, to conduct operations 512, 514, and 516. Operation 512 zeroes page 412, operation 514 zeroes page 414, and operation 516 zeroes page 416. Once the memory pages have been set to the desired value, application 300 provides memory reallocation 520 to the reallocation requestor.

Figure 6:
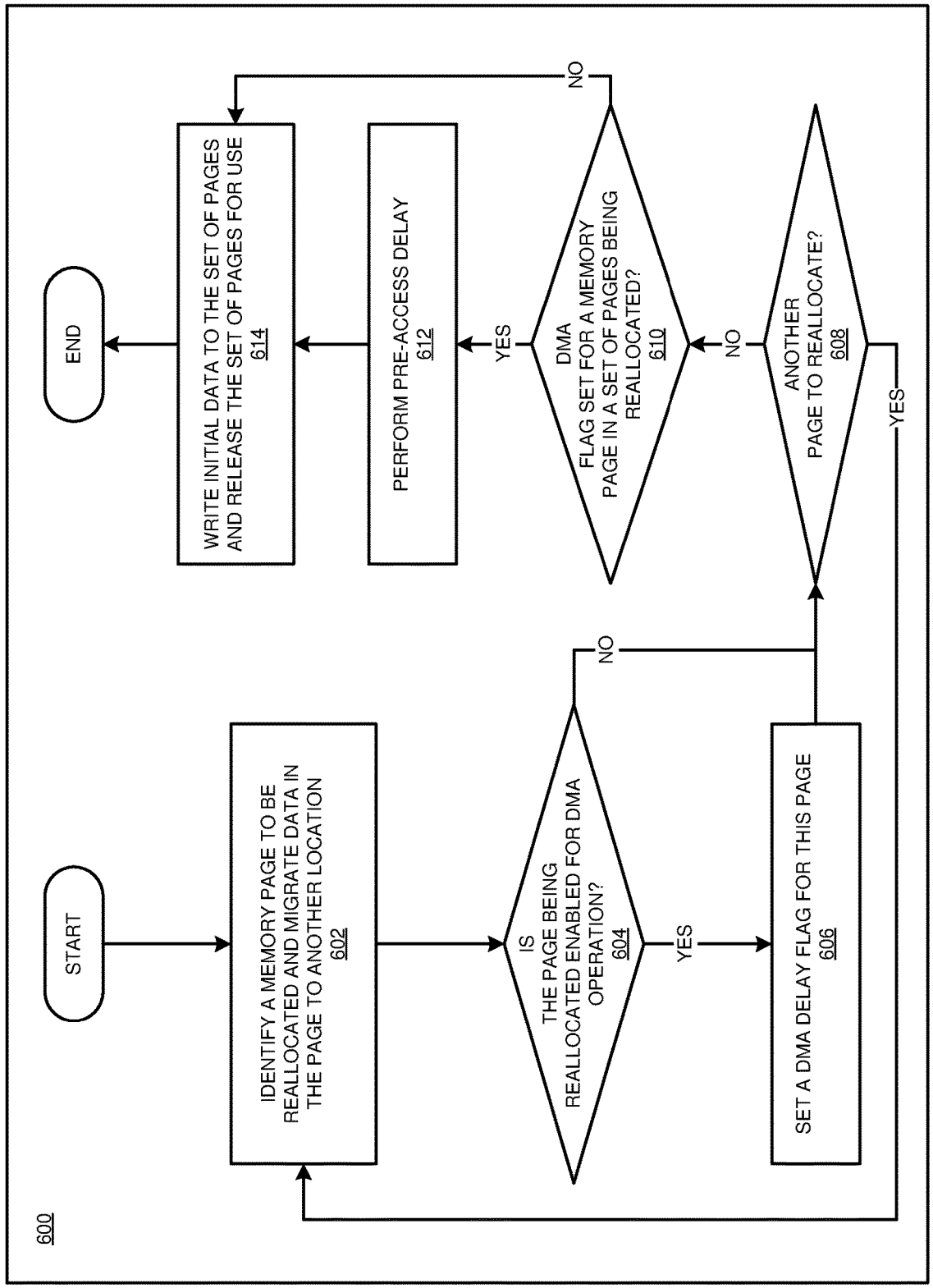
FIG. 6 depicts a flowchart of an example process for minimizing delay while migrating DMA mapped pages in accordance with an illustrative embodiment.

With reference to FIG. 6, this figure depicts a flowchart of an example process for minimizing delay while migrating DMA mapped pages in accordance with an illustrative embodiment. Process 600 can be implemented in application 300 in FIG. 3.

In block 602, the application identifies a memory page to be reallocated and migrates data in the page to another location. In block 604, the application determines whether the page being reallocated is enabled for DMA operation. If yes ("YES" path of block 604), in block 606 the application sets a DMA delay flag for this page. If not ("NO" path of block 604), or after block 606, in block 608 the application determines whether another page is being reallocated. If yes ("YES" path of block 608), the application returns to block 602. If not ("NO" path of block 608), in block 610 the application determines whether the DMA flag is set for a memory page in a set of pages being reallocated. If yes ("YES" path of block 610), in block 612 the application performs a pre-access delay. If not ("NO" path of block 610), or after block 612, in block 614 the application writes initial data to the set of pages and release the set of pages for use. Then the application ends.

Figure 7:
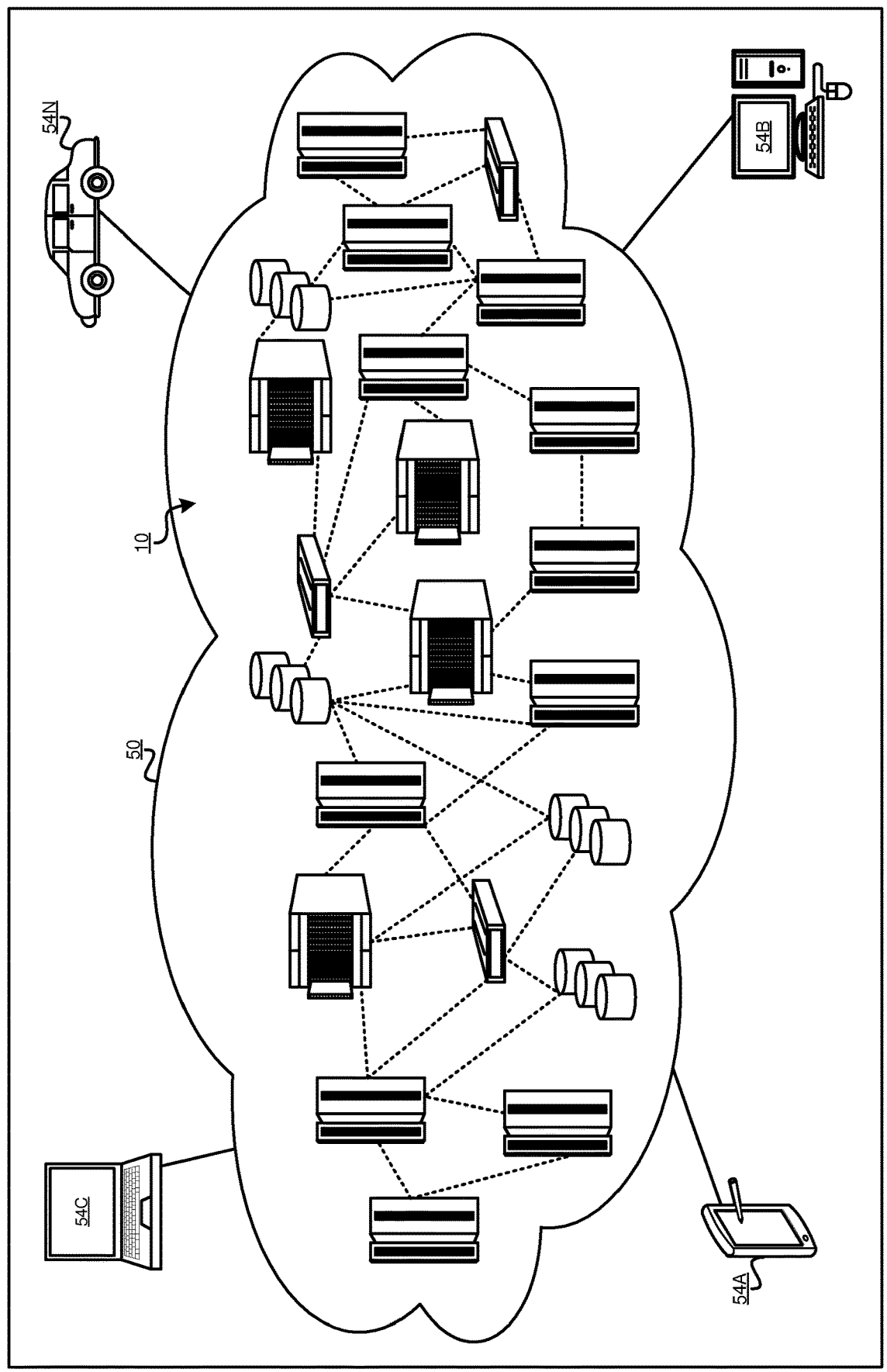
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
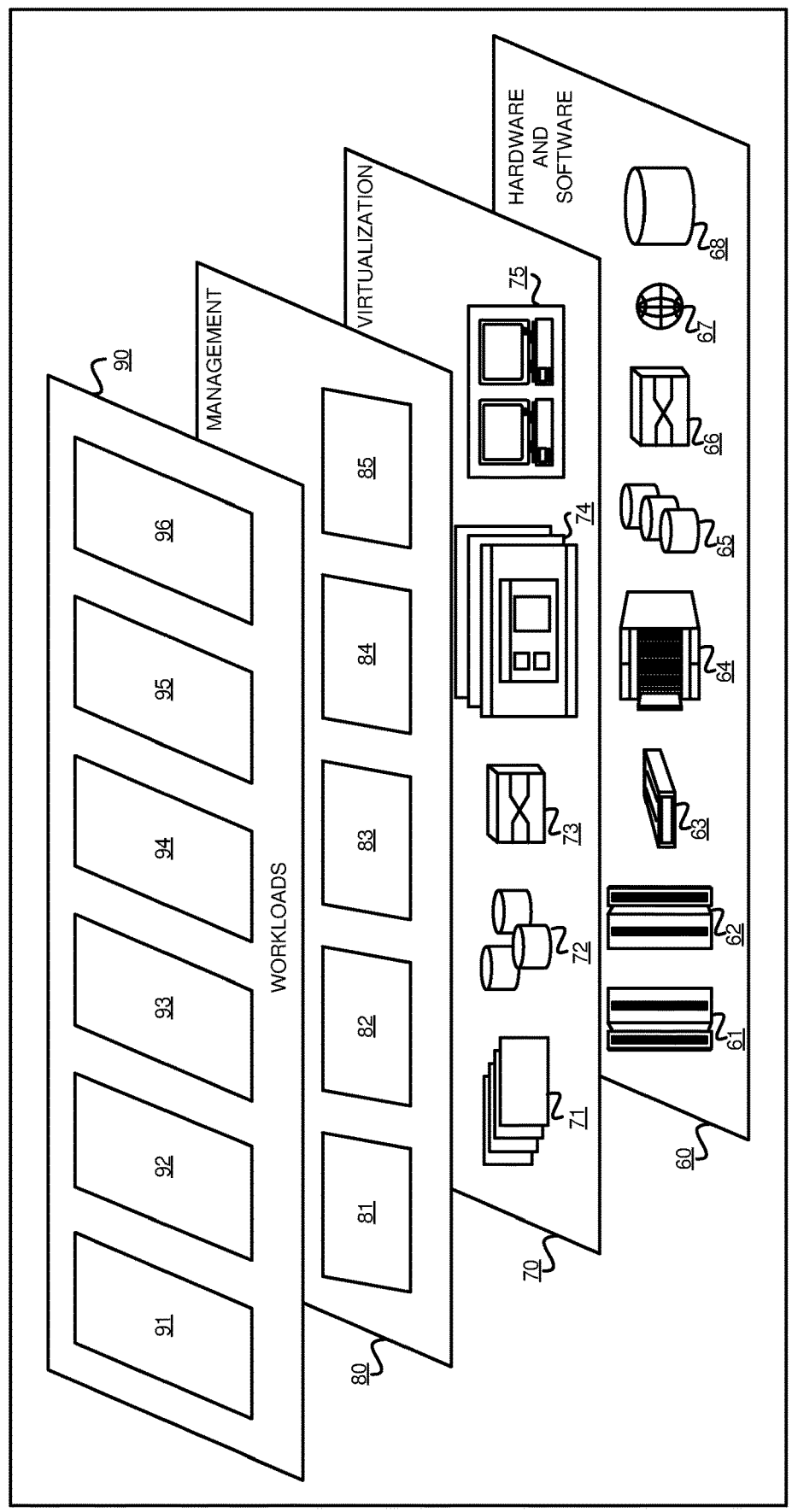
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for minimizing delay while migrating DMA mapped pages and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    determining, during a memory reallocation process, that a set of memory pages being reallocated are each enabled for a Direct Memory Access (DMA) operation; and
    performing, subsequent to completion of the memory reallocation process, prior to writing initial data to the set of memory pages, a pre-access delay, the pre-access delay performed concurrently for each memory page in the set of memory pages.

2. The computer-implemented method of claim 1, further comprising:
    setting, for a memory page enabled for a DMA operation, a DMA delay flag.

3. The computer-implemented method of claim 2, wherein the pre-access delay is performed responsive to determining that the DMA delay flag is set for a memory page in the set of memory pages.

4. The computer-implemented method of claim 1, further comprising:
    setting, for the set of memory pages enabled for a DMA operation, a DMA delay flag.

5. The computer-implemented method of claim 4, wherein the pre-access delay is performed responsive to determining that the DMA delay flag is set for the set of memory pages.

6. The computer-implemented method of claim 1, wherein the pre-access delay is performed by delaying program instruction execution for a predetermined amount of time.

7. The computer-implemented method of claim 1, further comprising:
    determining, during a second memory reallocation process, that a second set of memory pages being reallocated are each enabled for a Direct Memory Access (DMA) operation; and
    performing, responsive to determining that a time period greater than a threshold time period has not yet elapsed since a reallocation of a memory page enabled for DMA operation in the set of memory pages, subsequent to completion of the memory reallocation process, prior to writing second initial data to the second set of memory pages, the pre-access delay, the pre-access delay performed concurrently for each memory page in the second set of memory pages.

8. A computer program product for minimizing delay while migrating DMA mapped pages, the computer program product comprising:
    one or more computer readable storage media, and program instructions collectively stored on the one or more computer readable storage media, the program instructions comprising:
        program instructions to determine, during a memory reallocation process, that a set of memory pages being reallocated are each enabled for a Direct Memory Access (DMA) operation; and
        program instructions to perform, subsequent to completion of the memory reallocation process, prior to writing initial data to the set of memory pages, a pre-access delay, the pre-access delay performed concurrently for each memory page in the set of memory pages.

9. The computer program product of claim 8, further comprising:
    program instructions to set, for a memory page enabled for a DMA operation, a DMA delay flag.

10. The computer program product of claim 9, wherein the pre-access delay is performed responsive to determining that the DMA delay flag is set for a memory page in the set of memory pages.

11. The computer program product of claim 8, further comprising:
    program instructions to set, for the set of memory pages enabled for a DMA operation, a DMA delay flag.

12. The computer program product of claim 11, wherein the pre-access delay is performed responsive to determining that the DMA delay flag is set for the set of memory pages.

13. The computer program product of claim 8, wherein the pre-access delay is performed by delaying program instruction execution for a predetermined amount of time.

14. The computer program product of claim 8, further comprising:
    determining, during a second memory reallocation process, that a second set of memory pages being reallocated are each enabled for a Direct Memory Access (DMA) operation; and
    performing, responsive to determining that a time period greater than a threshold time period has not yet elapsed since a reallocation of a memory page enabled for DMA operation in the set of memory pages, subsequent to completion of the memory reallocation process, prior to writing second initial data to the second set of memory pages, the pre-access delay, the pre-access delay performed concurrently for each memory page in the second set of memory pages.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to determine, during a memory reallocation process, that a set of memory pages being reallocated are each enabled for a Direct Memory Access (DMA) operation; and
program instructions to perform, subsequent to completion of the memory reallocation process, prior to writing initial data to the set of memory pages, a pre-access delay, the pre-access delay performed concurrently for each memory page in the set of memory pages.

19. The computer system of claim 18, further comprising:
program instructions to set, for a memory page enabled for a DMA operation, a DMA delay flag.

20. The computer system of claim 19, wherein the pre-access delay is performed responsive to determining that the DMA delay flag is set for a memory page in the set of memory pages.

21. The computer system of claim 18, further comprising:
setting, for the set of memory pages enabled for a DMA operation, a DMA delay flag.

22. The computer system of claim 21, wherein the pre-access delay is performed responsive to determining that the DMA delay flag is set for the set of memory pages.

23. The computer system of claim 18, further comprising:
program instructions to determine, during a second memory reallocation process, that a second set of memory pages being reallocated are each enabled for a Direct Memory Access (DMA) operation; and
program instructions to perform, responsive to determining that a time period greater than a threshold time period has not yet elapsed since a reallocation of a memory page enabled for DMA operation in the set of memory pages, subsequent to completion of the memory reallocation process, prior to writing second initial data to the second set of memory pages, the pre-access delay, the pre-access delay performed concurrently for each memory page in the second set of memory pages.

24. A data processing environment comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to determine, during a memory reallocation process, that a set of memory pages being reallocated are each enabled for a Direct Memory Access (DMA) operation; and
program instructions to perform, subsequent to completion of the memory reallocation process, prior to writing initial data to the set of memory pages, a pre-access delay, the pre-access delay performed concurrently for each memory page in the set of memory pages.

25. A memory management subsystem, comprising:
a memory controller;
a memory manager, the memory manager configured to cause the memory controller to perform operations comprising:
determining, during a memory reallocation process, that a set of memory pages being reallocated are each enabled for a Direct Memory Access (DMA) operation; and
performing, subsequent to completion of the memory reallocation process, prior to writing initial data to the set of memory pages, a pre-access delay, the pre-access delay performed concurrently for each memory page in the set of memory pages.

* * * * *